United States Patent Office

3,291,558
Patented Dec. 13, 1966

3,291,558
TREATMENT OF LEATHER
Erich Bäder and Karl-Georg Kottenhahn, Hanau (Main), Germany, assignors to Deutsche Gold- und Silber- Scheideanstalt vormals Roessler, Frankfurt am Main, Germany
No Drawing. Filed Aug. 27, 1962, Ser. No. 219,763
Claims priority, application Germany, Aug. 29, 1961, D 36,916
7 Claims. (Cl. 8—94.21)

The present invention relates to a process which renders it possible to incorporate large proportions of high molecular weight polymers in leather in order to improve the mechanical properties thereof.

It is known that monomeric polymerizable organic compounds in the form of emulsions or dispersions can be drummed into tanned or pretanned leather and then be polymerized within the leather in the presence of peroxidic catalysts and accelerators.

The treatment of leather, skins and pelts with styrene or mixtures of styrene with other polymerizable synthetic organic monomers and to polymerize such monomers in the leather, skins or pelts with the aid of redox systems in which the reducing component is soluble in styrene is also known. Styrene, for example, can be employed in combination with polyesters of α-, β-unsaturated carboxylic acids with polyhydric alcohols. It is possible to obtain a rather high loading of the leather with polymers with such process. This was rather surprising as the unsaturated polyesters have molecular weights of about 3000 and prior to the development of the process it was thought that it would not be possible to introduce such high molecular weight components into the inner portions of the leather. Evidently, the absorption of the unsaturated polyesters on the leather fibres is promoted by the acid groups contained therein. In addition, in chrome tanned leathers attachment or inclusion can occur at the basic chrome complexes which also facilitates penetration of the leather. The leathers thus obtained have improved mechanical properties but these do not improve steadily with increasing polymer content but rather come to a standstill after a certain polymer content has been reached.

According to the invention it was unexpectedly found that high molecular weight neutral polymers which, for example, have a molecular weight of 100,000 and more can also be worked into leather in large quantities when one employs an aqueous dispersion which contains at least one polymerizable liquid vinyl or vinylidene compound (compounds containing a terminal $>C=CH_2$ group), at least one high molecular weight polymer of a vinyl or vinylidene compound, at least one ionic or non-ionic emulsifier or preferably a mixture of both types of emulsifiers and at least one polymerization promoter such as an acceleration or preferably a peroxidic polymerization catalyst. When mixtures of ionic and non-ionic emulsifiers are not employed, the non-ionic emulsifiers are preferred over the ionic emulsifiers. These dispersions are fulled into the leather in a known manner, such as, for example, in a fulling drum. Such fulling operation can be completed in ½ to 5 hours. The leathers employed can be non-fatted or also fatted and are tanned or pretanned according to one of the known processes, for example, vegetable tanning, chrome tanning, phosphoic acid tanning, salt tanning or formaldehyde tanning. Chrome tanned, as well as colored leathers are especially suited for treatment according to the invention. After the dispersions have been worked into the leather, the polymerization can be effected by heating to higher temperatures in the presence of a peroxidic polymerization catalyst. Preferably, however, the polymerization is effected by working in one or more accelerators or activators, preferably tertiary amines, and preferably emulsified in water after the peroxide containing monomer-polymer dispersion has been worked in. Conversely it is also possible to work in the accelerators with the polymerizable mixture and thereafter work in the peroxidic catalyst. This procedure, however, is somewhat more difficult to carry out than the first mentioned.

In both instances the polymerization is effected by methods known in bulk polymerization. When redox systems are used as catalysts these must be divided into two components and preferably be soluble in the polymerization mixture. Examples thereof are systems consisting of a peroxidic polymerization catalyst as the oxidizing component and an α-amino sulfone and/or an α-hydroxy sulfone as the other component or components. Tertiary amines and especially those having an aromatic radical directly attached to the nitrogen atom, such as dimethyl-p - toluidine, diisopropylol - m - toluidine, di - n - butylol-p-toluidine and the like are preferred as the reducing components of such systems. Expediently, the same or a similar emulsifier is employed for emulsifying the accelerator in water as was employed for the production of the dispersion of the polymerizable materials.

All peroxides known from bulk polymerization procedures can be employed with advantage as the peroxides employed according to the invention. Diacyl peroxides, such as dibenzoyl peroxide, lauroyl peroxide and the like, are especially suited but hydroperoxides may also be used together with other peroxides and especially diacyl peroxides. When peroxidic catalysts are used by themselves, that is, without additions of accelerators permitting cold curing, only those come into question the decomposition temperatures of which lie below the shrinking temperature of the leather to be treated.

In addition to the amines it is also possible to work other substances into the leather which favorably influence the polymerization in a known manner, such as, for example, compounds containing a labile (ionogenically bound) halogen atom, especially a labile chlorine atom, as well as traces of heavy metal compounds, especially copper compounds, such as copper naphthenate, copper oleate and the like.

The emulsifiers employed are of special significance to the process according to the invention. When ionic emulsifiers are used by themselves the higher molecular weight emulsifying substances, such as, for example, salts of polyacrylic or polymethacrylic acid, are especially effective. In the selection of the emulsifiers it is expedient to take care that those selected render possible the finest dispersion of the monomer-polymer mixtures so that as smooth a migration thereof as possible into the interior of the leather is assured. Furthermore, the dispersions should be sufficiently stable that they may be stored for a sufficient period of time. On the other hand, their stability should only be such that deposit on or in the leather fibres in the aqueous phase is still possible. As already indicated, not only ionic but also non-ionic or preferably mixtures of ionic and non-ionic emulsifiers can be employed. When mixtures of ionic and non-ionic emulsifiers are employed it is expedient to select ionic emulsifiers which can be absorbed by the cationic leather so that impregnation of the leather by the emulsified substances is facilitated. Such products as are obtained by ethoxylation of fatty or oil acids or oils, such as castor oil containing hydroxyl groups, are especially advantageously used as non-ionic emulsifiers. When such products are employed as the sole emulsifier they should have at least 200% of ethoxyl groups incorporated therein based upon the original weight of the acids. When emulsifier mixtures are employed the ethoxylation of the acids need not be as far reaching and under some circumstances 50 to 100% of ethoxyl groups suffice.

Expediently, aqueous dispersions are employed according to the invention which contain 5 to 60%, preferably 5 to 30% by weight, of organic components (disregarding the emulsifier). These organic components generally should contain 50 to 95% by weight of monomers and 5 to 50% by weight of polymers. Fundamentally, the proportions may be varied within wide limits. The possibilities are only limited by the molecular weight of the polymers employed as well as their solubility relation in the mixtures and their compatability for emulsification.

The lower alkyl esters of acrylic and methacrylic acid as well as vinyl compounds, such as styrene, vinyl acetate and the like, or their mixtures come into consideration as polymerizable monomeric components for the dispersions employed for the treatment of leather according to the invention. Methyl methacrylate is especially advantageous. Polymers or copolymers of such monomers can be employed as the polymer component of such dispersions. In this instance, also, polymethyl methacrylate is preferred. In addition, mixtures of such polymers can be employed.

According to a preferred embodiment of the invention the organic portion of the dispersion is not merely in the form of a simple monomer-polymer admixture but rather in the form of a prepolymerizate which contains about 30 to 40% by weight of polymerized monomer and is prepared by known procedures, such as described in Belgian Patent 572,359, French Patent 1,221,537 and German published application 1,083,057. Such prepolymers are produced in a so-called single pot reaction preferably with the aid of a sulfur containing regulator, such as, a mercaptan or one of its derivatives, in the presence of a radical forming catalyst such as azodiisobutyrodinitrile.

In the preparation of the dispersions employed according to the invention it is expedient first to add the emulsifier to the monomer-polymer mixture of prepolymerizate and then to admix the peroxidic catalyst. Thereafter it is dispersed in the required amount of water in a known manner. Copolymers can be employed in an analogous manner.

It is possible to incorporate up to 50% and more by weight of polymer in leather with the process according to the invention. After the dispersions have been worked in, the leather is not smeary and does not need to be rinsed or only be given a short rinse. Sticking together of the leather treated according to the invention has not been observed. After the polymerization has been completed within the leather, the leather may be given a subsequent fat liquoring treatment. After drying and framing the treated leathers have a full soft hand and are of light color. Odor of monomers is absent. The mechanical properties, especially the tensile and tearing strengths even after incorporation of 20% and more of polymer are considerably higher than of an untreated leather.

The following examples illustrate several embodiments of the invention:

Example 1

A chrome tanned calf leather which was stretched after neutralization and rinsing, with a water content of 60–65%, was given a prestuffing treatment with a fat liquor produced from a sulfonated sperm oil filtrate of the following characteristics:

| | Percent |
|---|---|
| Total fat content | 75.1 |
| Saponifiable portion | 58.3 |
| Unsaponifiable portion | 16.8 |
| Total sulfonic group content (of which 0.8% is inorganic and 2.59% is organic) | 3.39 |

The fat content of the prestuffed leather was 1% based on the weight of the leather. The leather was treated with an emulsion containing a prepolymerizate produced by partial polymerization of methyl methacrylate in a so-called single pot reaction in the presence of azodiisobutyrodinitrile as the catalyst and glycol dimercapto acetate as chain transfer agent. Such prepolymer by itself had a viscosity of 500 cp. 3% of a benzoyl peroxide paste (50% in dibutylphthalate) were added to the emulsion. The concentration of the prepolymerizate in the emulsion was 10.7% by weight and 40% by weight of such prepolymerizate with reference to the dry weight of the leather to be treated were provided in such emulsion. A 5% aqueous solution of the sodium salt of a copolymer of 30–40% of methyl methacrylate and 60–70% of methacrylic acid was used as the emulsifier in a quantity of 10% based upon the polymerization mixture. The quantity of emulsion employed for the treatment was 150% by weight with reference to the weight of the leather. The treatment was carried out in a tanning drum at room temperature and lasted 4 hours. Thereafter the leather was rinsed 20 minutes with clear water. Thereafter the impregnated leather was treated at room temperature for 1½ hours with an aqueous emulsion (400% by weight with reference to the weight of the leather) containing 0.4% of dimethyl-p-toluidine as accelerator emulsified with the aid of ethoxylated (60%) castor oil (2 parts per part accelerator). Thereafter the leather was rinsed 20 minutes with clear water and then fulled with 1% of fat based on the weight of the leather at 50° C. using 300% of liquor. A leather is obtained which is fulled and exhibits absolutely no smeariness and possesses a soft but grainy hand. The polymer content in the leather was 12.4%. Its permeability to water vapor was 519 mg. per 1000 mm.$^2$ per 24 hours.

Example 2

The procedure of Example 1 was repeated except that the prestuffing was omitted and the quantity of prepolymer was 20% by weight based on the dry weight of the leather and its concentration in the emulsion was 4.65%. Ethoxylated (200%) castor oil was used as the emulsifier in a quantity of 20% based upon the polymerization mixture. The loose portions of the thus treated leather were filled and exhibited no smeariness. The tensile strength of the treated leather was 404 kg./cm.$^2$ as contrasted to 274 kg./cm.$^2$ for the untreated leather control. The polymer content in the leather was 11%.

Example 3

The procedure of Example 1 was repeated except that the quantity of prepolymer in the emulsion was 10% and as the emulsifier, 20% by weight with reference to the polymerization mixture of a mixture of 20 parts by weight of ethoxylated (60%) castor oil and 10 parts of a $C_{12}$–$C_{14}$ fatty alcohol sulfate product containing about 35% actual fatty alcohol sulfate. The treated leather was of the same quality as that obtained in Example 2. The polymer content was 26.8% and the tensile strength 279 kg./cm.$^2$ (control untreated leather 262 kg./cm.$^2$).

Example 4

The procedure of Example 3 was repeated except that the quantity of prepolymer with reference to the dry weight of the leather was 70% and its concentration in the emulsion was 17%. The same emulsifier combination as in Example 3 was used. The leather was of the same quality as that of Example 2 and contained 38% by weight of polymer. Its tensile strength was 495 kg./cm.$^2$ (control untreated leather 365 kg./cm.$^2$).

Example 5

The procedure of Example 3 was repeated except that the quantity of prepolymer with reference to the dry weight of the leather was 100% and its concentration in the emulsion was 25%. The same emulsifier combination as in Example 3 was used. The leather was of the same quality as that of Example 2 and contained 48.5% by weight of polymer. Its tensile strength was 402 kg./cm.$^2$ (control untreated leather 361 kg./cm.$^2$).

Example 6

7.5 parts by weight of a polyvinyl methyl ether of medium viscosity, 6 parts by weight of methyl methacrylate, 3.5 parts by weight of triethylene glycol dimethacrylate, 3.5 parts by weight of vinyl acetate, 0.8 part by weight of a paste, containing 50% of benzoyl peroxide in 50% of dibutyl phthalate, 1.2 parts by weight of the sodium salt of tetrapropylene benzene sulfonic acid and 0.4 part by weight of ethoxylated castor oil were emulsified in 130 parts by weight of water. The pH of this emulsion was 7.0.

100 parts by weight of vegetable tanned sole leather with a water content of 48.5% were fulled in the said emulsion at room temperature for 4 hours. Then the leather was shortly rinsed with clear water and treated with 400 parts by weight of a second emulsion, containing 0.4% of dimethyl-p-toluidine and 0.2% of ethoxylated castor oil. The second treatment was carried out at room tmperature and lasted 1.5 hours. Thereafter the leather was rinsed 10 minutes with clear water and dried.

The thus treated leather contained 10% of polymerized resin and had a tensile strength of 200 kg./cm.$^2$ as compared with 145 kg./cm.$^2$ of the untreated leather.

Example 7

15 parts by weight of polyvinyl methyl ether of medium viscosity, 5 parts by weight of methyl methacrylate, 10 parts by weight of vinyl acetate, 1.2 parts by weight of a paste containing 50% of benzoyl peroxide in 50% of dibutyl phthalate, 1.8 parts by weight of the sodium salt of tetrapropylene benzene sulfonic acid and 0.6 part by weight of ethoxylated castor oil were emulsified in 130 parts by weight of water.

100 parts by weight of vegetable tanned sheep lining leather were treated with the said emulsion at room temperature for 4 hours. Then the leather was rinsed with clear water and treated with 400 parts by weight of a second emulsion, containing 0.4% of dimethyl-p-toluidine and 0.2% of ethoxylated castor oil.

The second treatment was carried out in a drum at room temperature and lasted 1.5 hours. Finally the leather was rinsed 10 minutes with water and dried.

The treated leather contained 13.8% of polymerized resin and had a water absorption of 100% as compared with 114% of the untreated leather.

Example 8

15 parts by weight of methyl methacrylate, 10 parts by weight of polystyrene with an average molecular weight of 100,000 to 200,000, 7 parts by weight of ethylene glycol dimethacrylate, 1.2 parts by weight of a paste containing 50% of benzoyl peroxide in 50% of dibutyl phthalate, 1.5 parts by weight of the sodium salt of sulfonated lauric alcohol and 3 parts by weight of ethoxylated castor oil were emulsified in 130 parts by weight of water.

A chrome tanned calf leather, pre-stuffed as described in Example 1, was treated with the said emulsion at room temperature for 4 hours. Then the leather was rinsed 10 minutes with clear water and treated with 400 parts by weight of a second emulsion containing 0.4% of dimethyl-p-toluidine and 0.2% of ethoxylated castor oil. The second treatment was carried out at room temperature and lasted 1.5 hours. Thereafter it was rinsed 10 minutes with clear water. After this treatment, the leather was stuffed with 1% of fat.

The treated leather had a soft but firm feel. It contained 24.1% of polymerized resin. The permeability to water vapor was 610 mg. per 100 mm.$^2$ per 24 hours. The tensile strength was 333 kg./cm.$^2$ in the average as compared with 300 kg./cm.$^2$ of the untreated leather.

Example 9

15 parts of monostyrene, 9 parts by weight of polystyrene with an average molecular weight of 100,000 to 200,000, 6 parts by weight of vinyl acetate, 1.2 parts by weight of a paste containing 50% of benzoyl peroxide in 50% of dibutylphthalate, 1.5 parts by weight of the sodium salt of sulfonated lauric alcohol and 3 parts by weight of ethoxylated castor oil were emulsified in 130 parts of water.

A chrome tanned calf leather, pretreated as described in Example 12, was fulled at room temperature with the said emulsion for 4 hours. Then the leather was rinsed 10 minutes with clear water. Thereafter the leather was treated with 400 parts by weight of a second emulsion containing 0.4% of dimethyl-p-toluidine and 0.2% of ethoxylated castor oil. The second treatment was carried out at room temperature and lasted 1.5 hours. Then the leather was rinsed 10 minutes with clear water and stuffed with 1% of fat.

The thus treated leather contained 26.8% of polymerized resin. The flanks were filled and had strengthened. The softness and the feel were the same as of the untreated leather. The permeability to water vapor was 630 mg. per 1000 mm.$^2$ per 24 hours. The tensile strength was 335 kg./cm.$^2$ as compared with 260 kg./cm.$^2$ of the untreated leather.

We claim:

1. In a process for the incorporation of polymeric material in leather by working aqueous dispersions of polymerizable organic substances into the leather and polymerizing such polymerizable substances within the leather with the aid of a polymerization catalyst, the steps of working an aqueous dispersion containing at least one liquid polymerizable organic monomer containing a terminal $>C=CH_2$ group and at least one high molecular weight polymer of a monomer containing a terminal $>C=CH_2$ group, the monomer-polymer content of the aqueous dispersion being 5 to 60% by weight and the monomer content in the monomer-polymer mixture being 50–95% by weight and the polymer content thereof being 5–50% by weight, an emulsifier component and at least one polymerization promoter dissolved in the monomer into the leather and polymerizing the monomer in the thus treated leather.

2. The process of claim 1 in which the polymerization promoter is a peroxidic polymerization catalyst and an emulsion of an accelerator is worked into the leather after the monomer-polymer containing dispersion is worked in to effect the polymerization.

3. The process of claim 1 in which the emulsifier component is a non-ionic emulsifier.

4. The process of claim 1 in which the emulsifier component is a mixture of a non-ionic emulsifier and an ionic emulsifier.

5. The process of claim 1 in which the monomer-polymer content of the aqueous dispersion is in the form of a prepolymer containing 30 to 40% by weight of polymer.

6. The process of claim 1 in which said monomer-polymer mixture is methyl methacrylate-polymethyl methacrylate.

7. The process of claim 1 in which the monomer-polymer content of the aqueous dispersion is in the form of a prepolymer of methyl methacrylate containing 30 to 40% by weight of methyl methacrylate.

References Cited by the Examiner

UNITED STATES PATENTS

| | | | |
|---|---|---|---|
| 2,347,712 | 5/1944 | Robinson et al. | 8—94.23 |
| 2,473,801 | 6/1949 | Kropa | 260—29.7 |
| 3,103,447 | 9/1963 | Lowell et al. | 117—142 X |
| 3,153,022 | 11/1964 | Calkins et al. | 260—86.1 |

WILLIAM D. MARTIN, *Primary Examiner.*

T. G. DAVIS, *Assistant Examiner.*